Patented June 30, 1931

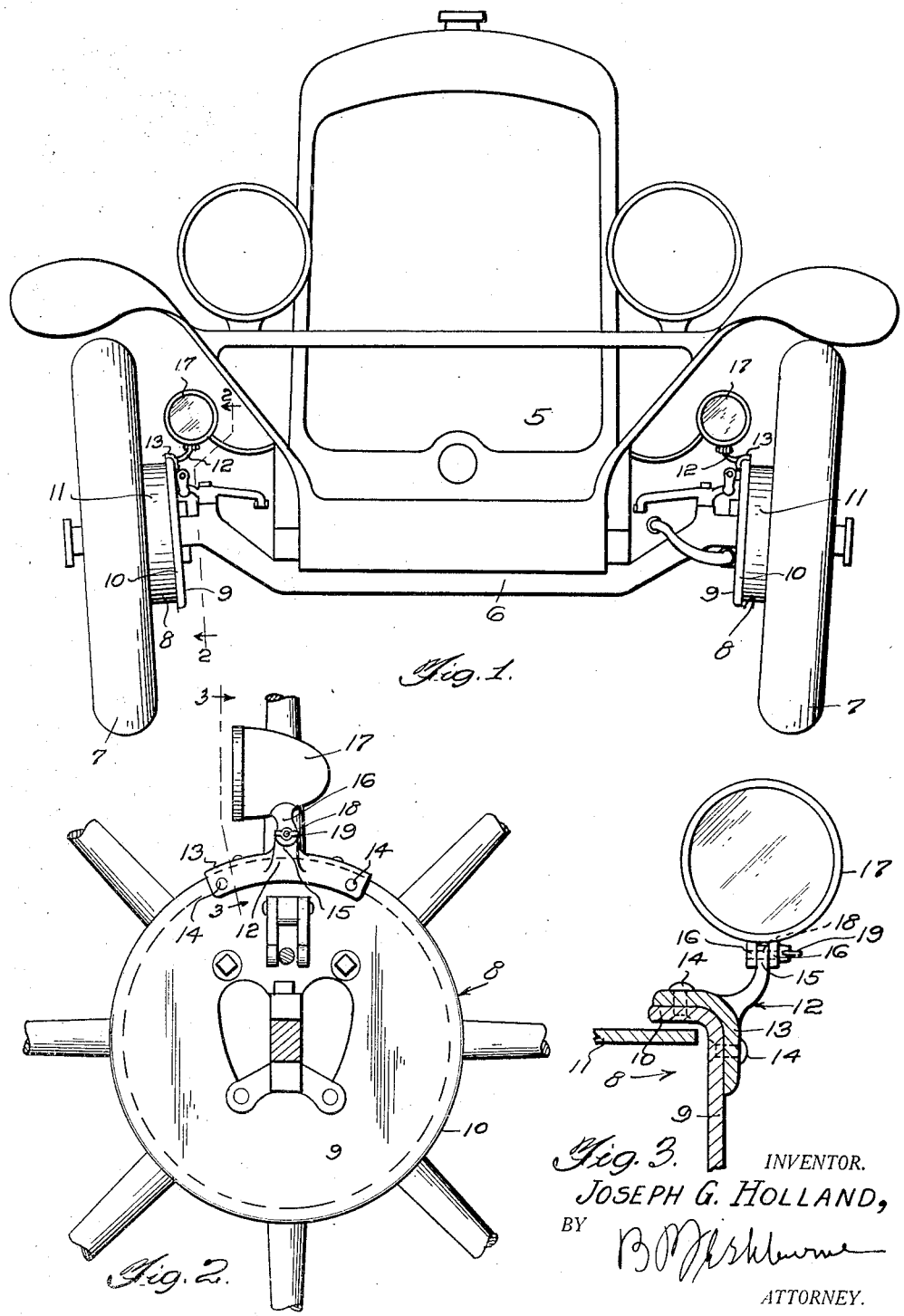

1,812,336

UNITED STATES PATENT OFFICE

JOSEPH G. HOLLAND, OF EDGEFIELD, SOUTH CAROLINA

STEERING HEADLIGHT FOR AUTOMOBILES

Application filed August 19, 1930. Serial No. 476,409.

My invention relates to improvements in steering headlights for automobiles.

I am aware of the fact that steering headlights for automobiles have been provided. These headlights usually are mounted upon the chassis of the automobile and shifted by connection with a part of the steering gear. These headlights operated by the movement of the steering gear have not gone into extensive use, which is believed to be due to the fact that their operation would not be reliable, and the constructions are complicated. The relative movement between the chassis and steering gear, and the constant vibration of an automobile renders it disadvantageous to use this type of headlight. It has also been proposed to mount the headlight upon the pivoted knuckle of the front axle, in the absence of the front wheel brake mechanism, but this could not be advantageously accomplished where front wheel brake mechanism is employed.

The application of the four wheel brakes to automobiles is of comparatively recent date. The use of brake mechanisms upon the front wheels of the automobiles has complicated the construction upon the front axle and has reduced the available space beneath the fenders. It is not believed that the ordinary type of shifting headlights actuated by the steering mechanism could be advantageously used in connection with the front axle of the automobile carrying brake mechanism. The brake mechanisms upon the front axle usually cover the steering knuckles carrying the spindles upon which the front wheels are mounted. These steering knuckles are, therefore, not accessible so that supports could be attached thereto, carrying lamps.

In accordance with my invention, I provide shifting headlights which are designed to be used in connection with the front axle brake mechanisms of an automobile. Means are provided whereby the headlights are directly and preferably rigidly mounted upon the non-rotating plates of the brake mechanisms. The mountings are preferably arranged at the tops of the non-rotating plates. This location brings the headlights in transverse vertical alignment with the spindles of the front wheels, it locates the headlights at the center of the horizontal arcs in which the front wheels turn, during steering, whereby the minimum turning movement of the headlights is required to maintain them facing parallel with the front wheels during the steering operation, and suitably elevates and locates the headlights in the remaining available space beneath the fenders, so that they may partake of their restricted turning movements without engaging with the fenders or the operating parts of the brake mechanisms, and also permits of the headlights being disposed at a proper elevation for projecting the light downwardly upon the roadway a suitable distance in advance of the automobile, which downward projection is preferably regulated by the angular adjustment of the headlights upon their mountings. The construction is extremely simple, rigid, strong, formed of few parts, may be manufactured cheaply, and may be installed upon practically any type of front wheel brake mechanism, without materially altering the construction of the brake mechanism.

In the accompanying drawings, forming a part of this specification, and in which like numerals are employed to designate like parts throughout the same, Figure 1 is a front end elevation of an automobile equipped with front wheel brake mechanisms, showing my steering headlights mounted upon the brake mechanisms, Figure 2 is a transverse section taken on line 2—2 of Figure 1, and, Figure 3 is a transverse section taken on 3—3 of Figure 2.

In the drawings, wherein for the purpose of illustration, is shown a preferred embodiment of my invention, the numeral 5 designates the radiator of an automobile of any well known or preferred type. The body of the automobile is suitably mounted upon a front axle 6, carrying steering or front wheels 7. These front wheels are equipped with brake mechanisms 8, of any well known or preferred type, included in the four wheel brake unit. These brake mechanisms embody inner non-rotatable plates 9, which turn horizontally with the front wheels during the steering movement of the same. The plates 9 are equipped at their circumference with flanges 10, receiving the edges of drums 11. As the brake mechanism is of any well known or preferred type, no further description is deemed necessary.

The numeral 12 designates a rigid bracket, provided at its lower end with a base 13, preferably having a substantial length and longitudinally curved to conform to the circumferential curvature of the flange 10. The base 13 is also preferably generally L-shaped in cross section, for engaging over the meeting edge of the non-rotating plate 9 and flange 10. This base 13 is rigidly attached to the plate 9 and flange 10 by rivets or bolts 14, while the same may be rigidly attached thereto by any other suitable means, as by welding or the like. The bracket or arm 12 is preferably offset inwardly and is provided at its upper end with an apertured knuckle 15, passing between apertured knuckles 16, rigidly secured to the lower portion of a headlight or lamp 17 of any well known or preferred construction. These apertured knuckles are connected by a clamping bolt 18, preferably equipped with a winged nut 19. It is obvious that by proper manipulation of the winged nut, the headlight may be angularly adjusted to project the light upon the roadway a suitable distance in advance of the automobile and rigidly locked to the bracket 12 in the selected adjusted position.

Particular attention is called to the fact that the bracket 12 is mounted at the top or uppermost point of the non-rotating plate 9. This brings the bracket adjacent to the center of the horizontal arc in which the front wheel turns during the steering operation. As a result of this, the headlight partakes of the minimum turning movement during the steering movement of the wheel, and remains faced parallel with the front wheel. In addition to this, the headlight is held at a proper elevation so that the light is projected over the front bumper and the headlight is properly located within the remaining restricted available space beneath the fender, and will not engage with the fender or the operating parts of the brake mechanism, during its steering movement.

In view of the foregoing description, it is obvious that the headlights are rigidly and directly mounted upon the non-rotating plates of the front brake mechanisms, and are bodily shifted horizontally with these plates during the steering movement of the front wheels. As a result of this, the light is automatically shifted during the steering action of the front wheels and is properly projected directly in advance of the front wheels.

It is to be understood that the form of my invention, herewith shown and described, is to be taken as a preferred example of the same, and that various changes in the shape, size and arrangement of parts, may be resorted to, without departing from the spirit of my invention, or the scope of the subjoined claim.

Having thus described my invention, I claim:—

The combination with brake mechanism connected with the front wheel of an automobile, said brake mechanism embodying a non-rotatable upstanding circular plate having a substantial diameter, of a base formed generally L-shaped in cross-section and longitudinally curved to conform to the curvature of the periphery of the plate, said base having generally horizontal and vertical flanges, the horizontal flange engaging with the periphery of the plate and the vertical flange engaging with the side of the same, means for rigidly attaching the flanges with the plate, a relatively short rigid bracket carried by the base and offset laterally in an inwardly direction from the same and extending above the base and provided with an apertured knuckle at its upper end, a lamp provided at its bottom with a pair of spaced apertured knuckles to engage upon opposite sides of the first knuckle, an adjustable bolt passing through the apertured knuckles so that the lamp may be angularly adjusted in a vertical plane and clamped to the bracket in a selected adjusted position, the arrangement being such that the combined length of the upper radius of the upstanding plate and the bracket serves to support the lamp at an elevation for projecting the light above the bumper, said bracket being arranged near the center of the horizontal arc within which the front wheel turns during the steering operation so that the turning movement of the lamp is reduced to the minimum.

In testimony whereof I affix my signature.

JOSEPH G. HOLLAND.